United States Patent [19]

Strait, Jr.

[11] Patent Number: 5,313,878
[45] Date of Patent: May 24, 1994

[54] MICROWAVE OVENWARE APPARATUS, HYDRATING MICROWAVE OVENS AND MICROWAVE WATER PURIFIER

[76] Inventor: Clifford C. Strait, Jr., 939 S. 48th St. #209, Tempe, Ariz. 85281

[21] Appl. No.: 901,993

[22] Filed: Jun. 22, 1992

[51] Int. Cl.⁵ .............................................. H05B 6/80
[52] U.S. Cl. ...................................... 99/475; 99/487; 99/DIG. 14; 219/731
[58] Field of Search ................. 99/451, 475, DIG. 14, 99/330, 345, 473, 487, 516, 474; 219/10.55 E, 10.55 R, 401; 126/369

[56] References Cited

U.S. PATENT DOCUMENTS

| | | | |
|---|---|---|---|
| 3,604,895 | 10/1969 | MacKay | 126/369 |
| 3,992,984 | 11/1976 | Treiber | 126/369 |
| 4,058,635 | 11/1977 | Durth | 426/509 |
| 4,154,861 | 5/1979 | Smith | 99/475 |
| 4,317,017 | 2/1982 | Bowen | 219/10.55 E |
| 4,373,511 | 2/1983 | Miles et al. | 126/369 |
| 4,439,656 | 3/1984 | Peleg | 99/DIG. 14 |
| 4,455,924 | 6/1984 | Wenzel | 99/482 |
| 4,460,822 | 7/1984 | Alden et al. | 219/401 |
| 4,655,192 | 4/1987 | Jovanovic | 219/401 |
| 4,700,685 | 10/1987 | Miller | 126/369 |
| 4,701,334 | 10/1987 | Durth | 219/401 |
| 4,835,351 | 5/1989 | Smith et al. | 219/10.55 E |
| 4,857,685 | 8/1989 | Vigano et al. | 219/10.55 E |
| 4,865,864 | 9/1989 | Rijswijck | 99/447 |
| 4,947,026 | 8/1990 | Groom et al. | 219/401 |
| 4,963,708 | 10/1990 | Kearns et al. | 219/10.55 E |

Primary Examiner—Timothy F. Simone
Assistant Examiner—Reginald L. Alexander
Attorney, Agent, or Firm—H. Gordon Shields

[57] ABSTRACT

Microwave oven apparatus includes provisions for adding moisture to foods being cooked in a microwave oven to reduce drying of the food during the cooking procedure. Different embodiments of a microwave oven include a microwave oven with mister elements, one mister element providing a cold mist and another mister embodiment providing a hot or steam mist derived from the heating of water in a reservoir of the microwave oven. A microwave oven may also include a water tray at the bottom of the oven, with water in the tray comprising the source of moisture for food being cooked in a dish within the oven. At the top of the oven, or above the mister elements, is a filter, preferably made of paper, or the like, through which moisture may permeate, but which prevents moisture condensing on the top of the microwave from falling onto the food in the form of droplets.

Cooking elements for cooking foods in a microwave oven include provisions for a water reservoir in an outer cooking element, with a inner cooking element holding food to be cooked. Different embodiments are disclosed, and different types of elements for containing or holding food to be cooked are also disclosed. Also disclosed are different embodiments of pitchers in which liquids may be heated relatively rapidly in microwave ovens, and apparatus for purifying water in a microwave oven by condensing water vapor.

7 Claims, 3 Drawing Sheets

MICROWAVE OVENWARE APPARATUS, HYDRATING MICROWAVE OVENS AND MICROWAVE WATER PURIFIER

BACKGROUND OF THE INVENTION

1. Field of the Invention

This invention relates to microwave ovens and, more particularly, to ovenware elements for use in microwave ovens and which provide hydrating functions and which reduce dehydration for food cooked in microwave ovens and, including food cooked directly in its packaging, whether frozen packaged foods or nonfrozen packaged foods, and microwave water purifiers.

2. Description of the Prior Art

U.S. Pat. No. 3,777,099 (Levinson) discloses method and apparatus for heating or cooking articles in a microwave oven. The microwave oven includes a sloping bottom and a plurality of apertures extending through the bottom at its lowest point and a pan beneath the openings for receiving liquids draining through the openings. Different types of food supporting elements are also disclosed and are supported within the microwave oven.

U.S. Pat. No. 3,854,023 (Levinson) discloses a container or heating member for use in a microwave oven. Included is a liquid absorptive body for absorbing liquids from the food being cooked.

U.S. Pat. No. 3,985,990 (Levinson) discloses another type of heating utensil for use in a microwave oven. The utensil includes outer and inner elements, and the inner element, on which food is disposed, includes a plurality of apertures from which liquid drains as cooking takes place.

U.S. Pat. No. 3,985,991 (Levinson) discloses a different type of utensil for cooking food in a microwave oven. The absorption of liquids is discussed as in the other above referenced patents.

U.S. Pat. No. 3,994,212 (Wong) discloses a drain pan for use in a microwave oven. The drain pan includes a plurality of ridges extending upwardly from the bottom surface and a groove running perpendicularly to the ridges and grooves. Food being cooked is supported on the ridges, and liquid drains to the grooves and into the central groove.

U.S. Pat. No. 4,306,133 (Levinson) discloses another type of utensil for baking meat or fruit pies in a microwave oven.

U.S. Pat. No. 4,317,017 (Bowen) discloses a utensil for steam cooking within a microwave oven. The apparatus includes a dish in which water is placed, a pan is placed over the water holding compartment with holes in the pan, and a tray on which food is placed above the pan. The entire cooking apparatus is enclosed so that only the water is subjected to microwave energy. The microwave energy then heats the water and steam from the heated water is in turn used to cook the food.

U.S. Pat. No. 4,871,892 (Samford) discloses another type of microwave cooking utensil designed for killing salmonella bacteria in liquids during the cooking of poultry. Water is placed in the bottom of a container, and a rack is placed above the surface of the water and food to be cooked is placed on the rack. Microwave energy boils the water and steam from the boiled water kills the salmonella bacteria.

U.S. Pat. No. 4,941,401 (Sarnoff) discloses a fish poaching dish for cooking fish in a microwave oven. Three separate elements are included in the apparatus. There is a base dish with ridges which extend upwardly from the bottom of the dish and which water is placed. There is a rack that is placed in the dish and is supported on the ridges in the bottom of the dish. A rack, having a plurality of elongated apertures extending to the bottom of the rack, is placed on the dish and is supported on the ridges in the bottom of the dish. Fish to be poached is placed on the rack. A cover, the third element.

While some of the above discussed patented apparatus utilize steam for cooking food in a microwave oven, none of the apparatus is generally concerned with keeping the food being cooked in the microwave oven from becoming dehydrated, and accordingly none of the apparatus include what may be referred to as hydrator apparatus for providing the necessary moisture during cooking.

The apparatus of the present invention overcomes the deficiencies of the prior art by providing hydrator apparatus for cooking food in a microwave oven to essentially moisten the food as it is being cooked, and to reduce the vapor loss from the food as the food is cooked in a microwave oven. The vapor lost from the food is returned to the cooking atmosphere. This allows the food to absorb the lost vapor or moisture.

SUMMARY OF THE INVENTION

The invention described and claimed herein comprises hydrator apparatus for a microwave oven which includes cooking elements for receiving food to be cooked in a microwave oven and for providing elements in the cooking ware to reduce the escape of moisture or water vapor from the food as the food is being cooked, and to circulate condensed moisture back to the food and to reduce moisture evaporated from the food being cooked from being lost to the food during the cooking process.

Several different embodiments are shown, including relatively simple apparatus which include vertical ridges extending upwardly from the bottom of microwave oven cookware and in which food is placed for heating, and more complex apparatus in which water may be placed, structure above the water on which food may be disposed, a filter element above the food for allowing steam to escape from the food area, but also allowing moisture to condense on the filter and be returned to the food as vapor, on the lid which is disposed over all the elements, which these water droplets drop back down on to the filter to be returned to the food area as vapor. The moisture condenses on the lid and allows the moisture to be reused. The moisture rolls down the lid to be returned to either the filter or the reservoir to be recycled.

Another embodiment includes misters permanently disposed within the microwave oven itself, and a water holding tray may or may not be utilized within the oven. Again, a filter element is disposed above the food and above the misters to provide a surface on which vapor may pass through and condense on a convex or concave upper surface tray and which allows the condensed vapor to drop down on the filter and from which the condensed moisture may return to the atmosphere in which the food is located for hydrating purposes. The embodiments include different types of filter frames for holding the filters which allow steam or vapor to pass through and on which moisture may land after condensing.

Different embodiments of filters are utilized, with some filters comprising only paper towels, and other filters utilizing some type of screen or mesh.

Among the objects of the present invention are the following:

To provide new and useful oven ware apparatus for cooking foods in microwave oven;

To provide new and useful apparatus for hydrating food being cooked in a microwave oven;

To provide new and useful hydrator apparatus for a microwave oven;

To provide new and useful microwave oven apparatus for providing moisture for food cooked in a microwave oven;

To provide new and useful microwave ovenware having provisions for holding water and for providing filter elements to allow steam to escape and to allow moisture to condense and fall into a reservoir;

To provide new and useful microwave ovenware in which condensation is prevented from falling onto food being cooked;

To provide new and useful apparatus for heating liquids in a microwave oven; and To provide new and useful apparatus for purifying water in a microwave oven.

DESCRIPTION OF THE PREFERRED EMBODIMENT

Figure 1:
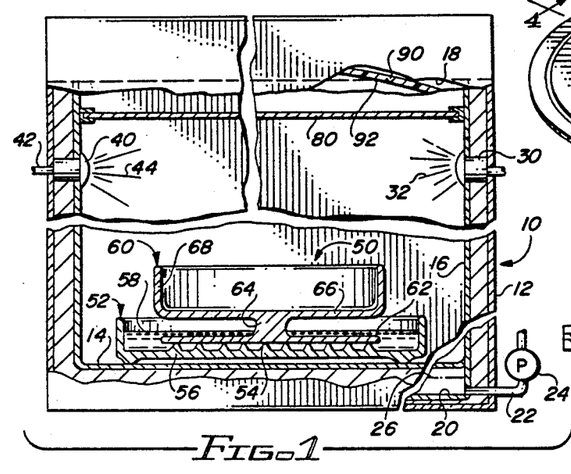
FIG. 1 is a view in partial section of a composite microwave oven including the apparatus of the present invention.

FIG. 1 is a side view in partial section of a composite microwave oven 10. The microwave oven 10 includes structure illustrating several embodiments. Included generally is a cabinet 12 which is of a generally rectangularly configuration. For practical purposes, insofar as the present invention is concerned, the cabinet 12 is generally rectangular and it includes a bottom 14 four walls 16, and a ceiling or top 18. At the upper portion of the walls 16 are two misters 30 and 40. The two misters represent two different embodiments of mister elements.

It will be noted that the oven apparatus is illustrated with broken lines. The purpose of the broken lines is to help delineate the different elements or embodiments of structure which may be incorporated into the oven apparatus 10.

The mister 30 sprays hot mist or steam into the oven apparatus 10. The hot mist or steam comes from a water 26 in reservoir 20 beneath the bottom 14. The water 26 may be heated by microwave energy prior to starting the cooking cycle of the food to be cooked in the oven apparatus 10. There may be a timed preheat cycle for the oven apparatus 10 for heating the water 26 in the reservoir 20 to provide hot water for the mister 30 prior to the cooking cycle of the food to be cooked in the oven apparatus 10. A conduit 22 extends from the reservoir 20 to the mister 30. Line water pressure on a pump 24 disposed in the conduit 22 is used to force on pump the hot water 26 from the reservoir 20 to the mister 30.

The mister 40 is connected to a water conduit 42, which may simply be connected to a water line in a manner similar to the water connections for ice cube trays and water chillers in refrigerators. The mister 40 provides a cold mist 44 in accordance with the water source to which the water input conduit 42 is connected.

If desired, there could be an electrical heating element in the misters 30 and 40 to provide heat, or additional heat, for the water sprayed into the microwave oven 10. In the alternative, the use of an electric heating element in the mister 30 may obviate the necessity for the reservoir 20 and the pump 24. The mister 30 may simply be connected to a water line, as with the mister 40, but the mister 30 could include a heating element for the in flowing water.

Disposed on the bottom 14 of the microwave oven cabinet 12 is a hydrator dish apparatus 50. The hydrator dish apparatus 50 includes a water tray 52 in which is disposed a cooking dish 60. The water tray 52 includes corrugations or ridges 54 on its bottom 56.

A cooking dish 60 is disposed in the water tray 52. The dish 60 includes a bottom platform 62 which is disposed on the corrugations or ridges 54. Water 58 is disposed in the water tray 52.

Extending upwardly from the bottom platform 62 of the cooking dish 60 is a stem 64. The stem 64 is a central stem and it supports a dish bottom portion 66 above the bottom platform 62.

Dish walls 68 are secured to and extend upwardly from the bottom 66. The use of the stem 64, which extends upwardly above the water 58, helps to maximize the surface area of the water 58 for moisturizing purposes.

Food to be cooked is disposed on the dish bottom 66 and within the walls 68.

The cooking dish 60 need not include a lid. Three separate water sources are illustrated for providing moisture for food in the cooking dish 60. The first water source is the mister 30 with its hot water spray or steam 32. For food being cooked in the microwave oven 10, the hot water spray or steam 32 comprises a source of liquid help reduce the dehydration or drying out of food. That is, the moisture put out by the mister 20 in the form of spray 32 provides a moisturized or vaporized atmosphere to help reduce moisture loss in the food as the food is being cooked. The second source of moisture is the direct tap water mister 40, discussed in detail above.

The use of the water tray 52, with water 58 therein, provides a third source of moisture for food being cooked within the microwave oven 10. The corrugations or ridges 54 on the bottom 56 of the water tray 52 increase the surface area for heating for causing the water 58 to be heated and turned into steam or water vapor. The water vapor then is used to help prevent the food from drying out.

A filter 80 is disposed in the microwave oven apparatus 10 above the misters 30 and 40. The filter 80 may be a paper towel or other appropriate element which will allow moisture to pass through, but will prevent water droplets from falling directly onto food being cooked in the oven 10. The filter 80 is appropriately supported downwardly from the ceiling or top 18 and above the mister 30 and 40.

Above the filter 80 is a condensing element 90. The condensing element 90 includes a concave surface 92 on which vapor passing through the filter 80 condenses. The condensed vapor or moisture then runs down the surface 92 and onto the filter element 80 for reuse as vapor.

The moisture from any of the water sources rises in the oven 10. The moisture tends to condense on the walls 16 and on the surface 92. The filter 80 allows moisture to pass upwardly to the concave surface 92. However, condensed water droplets will not pass through the filter downwardly, and thus the water droplets will not fall directly onto food being cooked in the oven 10.

Any moisture condensing on the walls 16 may drop downwardly to collect in the reservoir 20.

It will be noted that the various water sources discussed above and illustrated in FIG. 1 in conjunction with the apparatus 10 may be used as desired and as appropriate for the particular circumstances.

Figure 2:
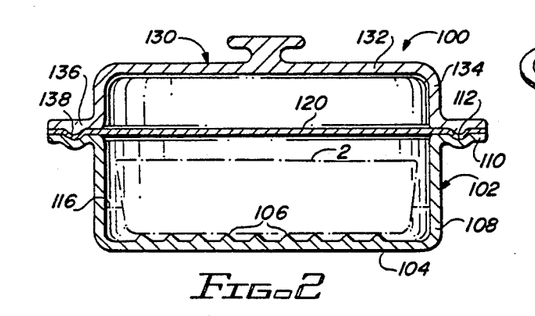
FIG. 2 is a side view in partial section of the apparatus included in the present invention.

FIG. 2 comprises a side view in partial section of cooker apparatus 100. The cooker apparatus 100 includes a lower cooker receptacle 102 in which is disposed a dish 2. The dish is shown in dash dot line. The cooker apparatus 100 may be used in contemporary microwave ovens without providing the moisturizing elements, such as discussed above for the oven apparatus 10.

The cooker receptacle 102 includes a bottom 104, and a plurality of corrugations or ridges 106 extend upwardly from the bottom 104. The purpose of the corrugations or ridges 106 is to increase the surface area of the bottom 104 to increase the heating speed of the water, which accelerates the evaporation of moisture within the cooker apparatus 100.

Extending upwardly from the bottom 104 are walls 108. The walls terminate in an outwardly extending flange 110. A groove 112 extends downwardly in the outer flange 110.

A circular filter 120 is disposed on the flange 110. A lid 130 is in turn disposed on filter 120 and holds the filter 120 in place.

The lid 130 includes a top portion 132 and walls 134 extend downwardly from the top portion 132. The wall 134 terminates in an outwardly extending flange 136. The flange 136 includes a downwardly extending ridge 138. The ridge 138 matingly extends into the groove 112 of the flange 110 of the cooker receptacle 102. The top portion 132 may also include a convex outer configuration, with a concave inner surface, if desired.

Figure 3:
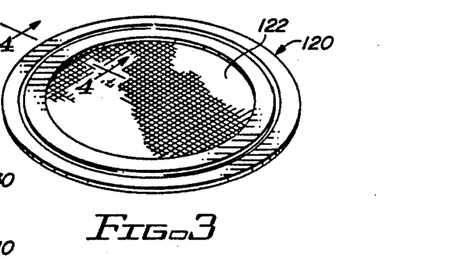
FIG. 3 is a perspective view of a portion of the apparatus of FIG. 2.
Figure 4:
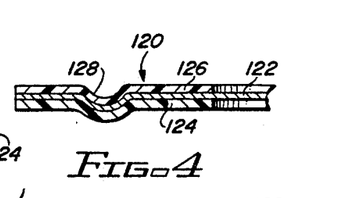
FIG. 4 is a view in partial section taken generally along line 4—4 of FIG. 3.

As best shown in FIG. 3, which is a perspective view of the filter 120, and as also shown in FIG. 4, which is a view in partial section through the outer portion of the filter 122, the filter 122 conforms to the general configuration of the cooker 102 and the lid 130.

The filter 120 includes a generally permeable center portion 122. The center portion 122 is generally coextensive with the interior portion of the cooker receptacle 102 and the lid 130. The outer portion of the filter 122 includes a pair of rim areas which are disposed on opposite sides of the permeable center 122. There is a bottom rim 124 and a matingly engaging upper rim 126. The outer periphery of the center portion 122 is disposed between, and is appropriately secured to, the bottom rim 124 and the upper rim 126. The configuration of the rims 124, 126 and the center 122 includes a groove 128. The outer bottom of the groove 128 extends into the groove 112 of the flange 110 and receives the ridge 138 of the lid 130.

The filter 120 is permeable to allow water vapor to move through it, but it does not allow for the passage of droplets or other relatively solid or viscous liquid elements. The filter 120 allows the moisture in the form of vapor to flow through it and to condense on the bottom surface of the top 132 of the lid 130. The condensing moisture then falls onto the filter 120. But it may not pass downwardly through the filter and onto the food cooking in the dish 2.

Figure 5:
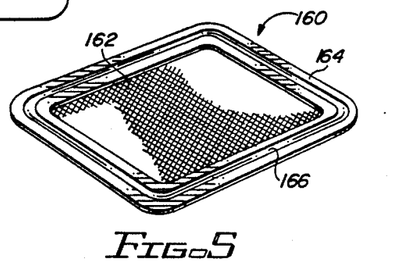
FIG. 5 is a perspective view of an alternate embodiment of the apparatus of FIG. 3.

FIG. 5 comprises a rectangular version of the round filter 122. The rectangular filter 122 includes a permeable center portion 152 with a rim 164 secured to the outer periphery of the permeable center 162. The rim 164 is preferably of two portions, as best illustrated in FIG. 4, with a top a bottom portion and the outer periphery of the center 162 between the two portions. A groove 166 extends downwardly for mating engagement with a groove and a ridge in a cooking receptacle and a lid, in the same general manner as discussed above for the filter 120.

Figure 6:
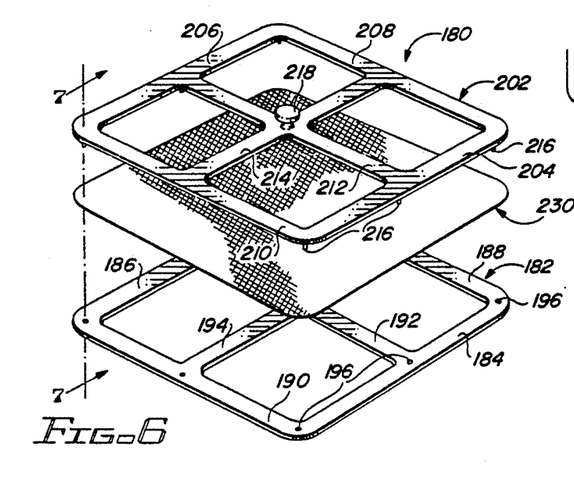
FIG. 6 is an exploded perspective view of an alternate embodiment portion of the apparatus of the present invention.

FIG. 6 is an exploded perspective view of another type of filter apparatus usable with the cooking apparatus of the present invention. FIG. 6 discloses a relatively large filter holder apparatus 180 with a two part frame and replaceable filter element. The filter holder apparatus 180 comprises a relatively large filter, again including three parts, but with a different general structural configuration from that illustrated in FIGS. 3, 4, and 5.

Figure 7:
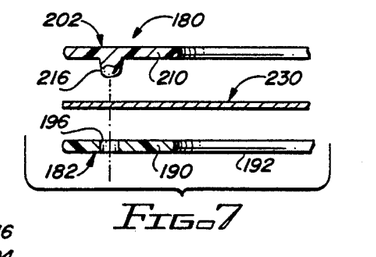
FIG. 7 is a view in partial section taken generally along line 7—7 of FIG. 6.

FIG. 7 is an exploded perspective view of an outer rim portion of the filter apparatus 180 taken generally along 7—7 of FIG. 6.

Figure 8:
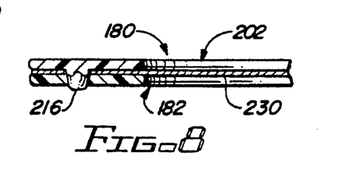
FIG. 8 is a view in partial section of the assembled apparatus of FIG. 7.

FIG. 8 is a sequential view in partial section following the illustration of FIG. 7 in which the three portions of the filter apparatus are shown disposed together or secured together. For the following discussion, reference will primarily be made to FIGS. 6, 7, and 8.

The filter holder apparatus 180 includes a bottom holder element 182 which is generally of a rectangular configuration. The bottom holder element 182 includes an outer rim having four sides, including a side 184, a side 186, a side 188, and a side 190. There are two cross pieces which bisect the sides. The cross pieces include a cross piece 192 which extends between the sides 184 and 186, and a cross piece 194 which extends between the sides 188 and 190.

At the corners of the bottom element 182, at the mid points of the sides and at the intersection of the cross-pieces, are apertures 196. The apertures 196 mate with pins which extend downwardly from an upper holder element 202.

The upper holder element 202 is substantially identical in general configuration to the bottom holder 182. The upper holder element 202 includes an outer rim side 204, a side 206, a side 208, and a side 210. There are two cross pieces which bisect the outer sides. The cross pieces include a cross piece 212 which extends between the sides 204 and 206 and a cross piece 214 which extends between the sides 208 and 210.

Extending downwardly from the juncture of the sides and from the mid points of the sides and the intersection of the cross pieces are feet 216. The feet 216 are illustrated as slightly tapered to matingly extend through the also slightly tapered apertures 196 in the bottom holder element 182 for a relatively snug fit.

The upper holder element 202 also includes a handle 218 which extends upwardly form the juncture or intersection of the cross pieces 212 and 214. When the two holder elements 182 and 202 are secured together, with a filter element 230 disposed between them, the apparatus 180 may be picked up and handled by means of the handle 218.

The filter holder apparatus 180 is renewable in that the two holder elements 182 and 202 may be taken apart for replacement of the filter element 230.

The spaces between the outer sides and cross pieces are illustrated as square or rectangular areas, with the cross pieces providing additional support. Previously, the specific configuration of the filter holder apparatus may vary or may be as desired for a particularly configured cooker.

The filter element 230 functions in substantially the same manner as discussed above in conjunction with the filter elements 120 and 160. The filter element 230 is permeable to allow for the movement of vapor upwardly through it, but it restricts the movement of "solid" elements, or water droplets or other elements which may be carried upwardly from food being cooked beneath it. At the same time, the filter element prevents condensed water droplets from a lid above the filter holder apparatus 180 from dropping onto food being cooked.

The filter elements illustrated and discussed above may be paper towels, and other filters utilizing some type of screen or mesh and that could be made of many different types of materials. The filter elements prevent condensation from dropping back directly onto the food, but allow for the upward passage of water vapor. If condensed water droplets were to drop directly onto some foods, those foods being cooked could become soggy.

Figures 9, 10:
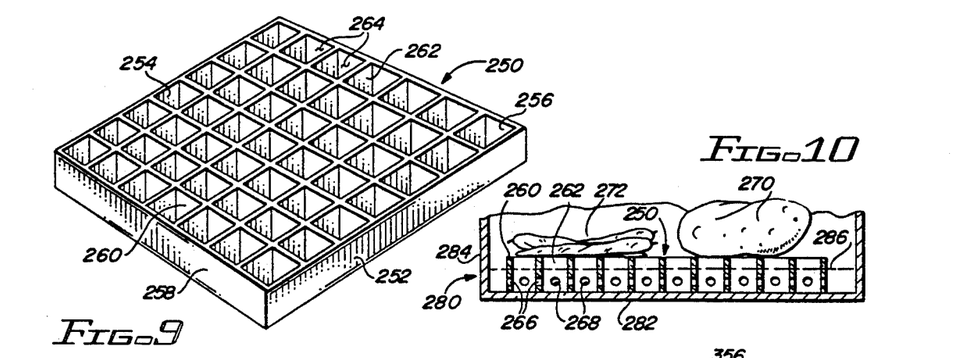
FIG. 9 is a perspective view of another alternate embodiment of a portion of the apparatus of the present invention.
FIG. 10 is a side view in partial section illustrating the use environment of the apparatus of FIG. 9.

FIG. 9 is a perspective view of support apparatus 250 usable for supporting another dish or for supporting vegetables directly above the water for cooking in a microwave oven. The dish or vegetables are held above water by the support apparatus 250, as will be discussed below.

FIG. 10 is a side view in partial section of the support apparatus 250 shown in its use environment, or in a use environment, such as in conjunction with a cooker or cooking receptacle 280. For the following discussion, reference will be made to both FIGS. 9 and 10.

The support member or apparatus 250 may be considered as an "egg crate" type element designed to be disposed within a holder or receptacle, such as a receptacle 280, for cooking purposes. The receptacle 280 may be a cooker or pot, or the like, which includes a bottom 282 and sides 284. The receptacle 280 includes water 286. The support member 250 is disposed on the bottom 282. The top of the support member 250 is above the top of the water 286.

The support member 250 is illustrated as being of a generally rectangular or square configuration, which includes four sides. The sides include a side 252, a side 254, a side 256, and a side 258. There are a plurality of interior partitions 260 and 262 which are disposed generally perpendicular to each other. The partitions 260 extend between the sides 252 and 254, and the partitions 262 extend between the sides 256 and 258. Between the partitions, or within the partitions, are spaces 264. The support apparatus 250 does not include a bottom, and accordingly spaces 264 extend fully through the apparatus 250. Accordingly, the water 286 will rise in the spaces 264, as shown in FIG. 10.

Each of the partitions 260 and 262 include apertures 266 and 268 respectively below the water line to insure that the water 286 is evenly disposed on the bottom 282. Instead of the apertures 266 and 268, the partitions may include slots extending upwardly from the bottoms of the partitions for the same purpose.

It will also be noted that the configuration of the support apparatus 250 may be as desired for a particular cooker. Accordingly, the configuration of FIG. 9 is illustrative only.

Vegetables may be disposed directly on the tops of the partitions 260 and 262 for cooking purposes. In FIG. 10, a potato 270 is shown disposed on the tops of the partitions 260 and 262 of the holder 250, and some string beans 272 are also shown disposed on the top of the holder apparatus 250.

It will be noted that a top filter is not utilized with the support 250 as shown in FIG. 10. Rather, it is desirable to have the condensed water droplets dropped directly onto the vegetables. As a matter of fact, it may be advantageous to have a top lid with a flat bottom surface or with a pattern of texture or a ridged surface for the cooking receptacle 280 so that condensed droplets of moisture will drop directly down onto the vegetables 270 and 272 for hydrating purposes. However, for other foods disposed on the support 250, such as pizza, french fries, chicken, rolls, etc., a lid, filter, and dish may be required.

It will be understood that the spaces between the partitions 260 and 262 may be as small as desired in order to accommodate different types of vegetables. Relatively large vegetables, such as a potato 270, and relatively long vegetables, such as string beans 272, may be easily accommodated on top of a support 250 with a relatively large spaces, or relatively far apart partition elements as shown. However, a similar holder may have to have much finer spaces when cooking vegetables such as peas, or the like. Obviously, the corresponding spaces to the spaces which would correspond to the spaces 264 would have to be rather small, which means that the partitions would have to be quite close together, to accommodate small diameter elements such as peas.

In the alternative, a screen may be disposed on the support 250 for small food elements, such as peas, beets, etc. Such a screen or mesh with its own support could function much the same as support 250. For larger vegetables, or for vegetables with elongated shapes, such as string beans, the spaces may be larger, and accordingly the partitions may be farther apart.

Figure 11:
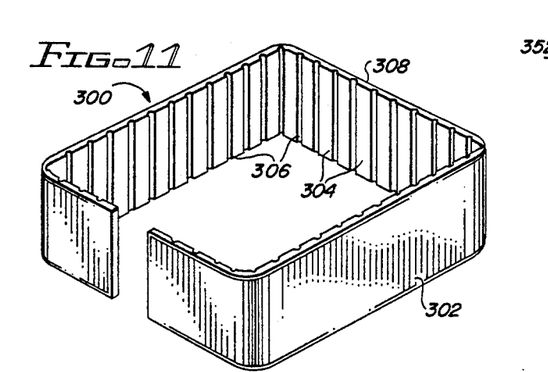
FIG. 11 is a perspective view of another alternate embodiment of the apparatus of the present invention.

FIG. 11 is a perspective view of spacer apparatus 300 which may be configured as desired, according to the cooking utensil being used and according to a particular filter or other element to be supported on the spacer.

Figure 12:
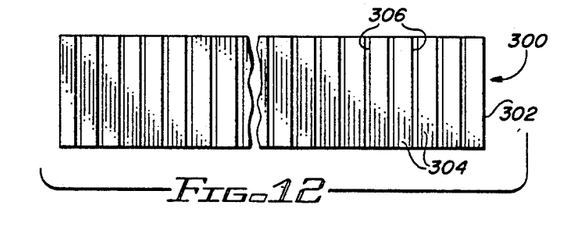
FIG. 12 is a plan view of the apparatus of FIG. 11.

FIG. 12 is a plan view of the apparatus 300. For the following discussion, reference will be made to both FIGS. 11 and 12.

The spacer apparatus 300 comprises an upwardly extending wall element 302 with a smooth outer periphery and which is illustrated as having a plurality of alternating lands 304 and grooves 306 on an interior periphery of the apparatus. The alternating lands and grooves allow the spacer apparatus 300 to be folded or bent appropriately in order to be configured as desired for a particular microwave cooking utensil being used. The apparatus 300 includes a top 308 on which, for example, a filter may be disposed. The height of the wall element 302 may vary.

The apparatus 300 comprises a spacer element which is preferably made of microwave permeable material that may be disposed in an open dish within a microwave oven. Or, in the alternative, the spacer apparatus 300 may be placed within a microwave oven which includes misters, such as misters 30 or 40 shown in FIG. 1.

The filter apparatus 180 of FIG. 6 may be placed on the top 308. Food being cooked will be placed within the wall element 302. The filter element 180 will help to hold moisture in so as to reduce the dehydration of the food being cooked, but will allow for the passage of water vapor upwardly. Condensed water vapor will flow down the sides of the microwave oven apparatus, or a dish, or other receptacle, such as the receptacle 280 of FIG. 10, all as discussed above, and thus may be reused to help in the vaporizing of the cooking atmosphere of the food being cooked, or to help reduce the moisture loss in the food being cooked.

Figure 13:
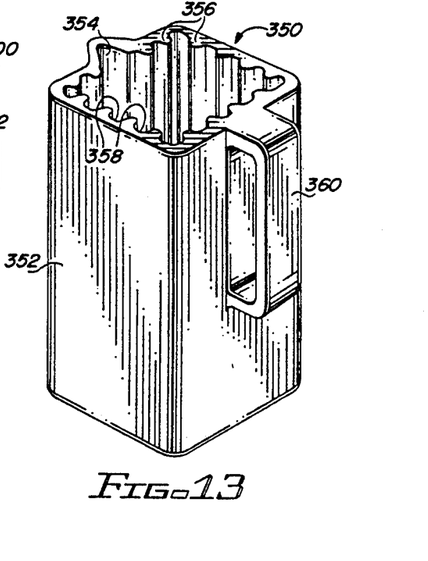
FIG. 13 is a perspective view of another alternate embodiment of apparatus embodying the present invention.
Figure 14:
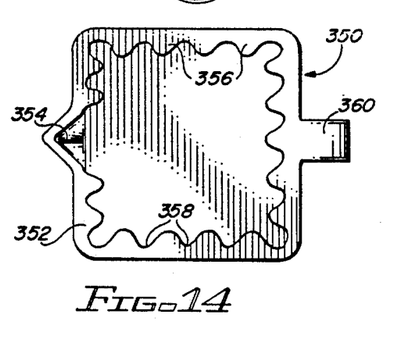
FIG. 14 is a top view of the apparatus of FIG. 13.

FIG. 13 is a perspective view of pitcher apparatus 350 which may be used to heat liquids in a microwave oven. FIG. 14 is a top view of the pitcher apparatus 350 of FIG. 13. For the following discussion, reference will made to both FIGS. 13 and 14.

The pitcher 350 includes a receptacle 352 shown having a generally square configuration, but the pitcher could have any desired configuration. The receptacle 352 includes a bottom and upwardly extending walls. The receptacle 352 includes a spout 354 for convenience in pouring liquids out of the pitcher 350.

The exterior of the receptacle 352 is smooth, while the interior includes alternating ribs 356 and grooves or flutes 358. The purpose of the ribs and grooves is to increase the surface area against which liquid will be disposed for purposes of heating the liquid within the pitcher as rapidly as possible.

A handle 360 is secured to the receptacle 352 on the side opposite the spout 354 for convenience in handling, holding, pouring, and generally using, the apparatus.

Figure 15:
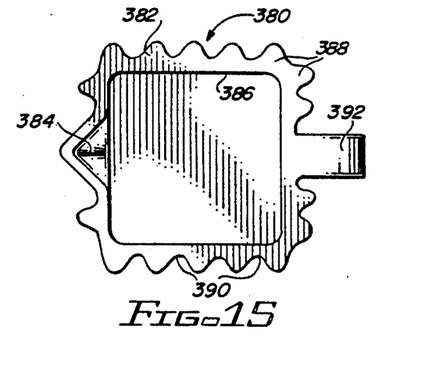
FIG. 15 is a top view of an alternate embodiment of the apparatus of FIGS. 13 and 14.

FIG. 15 discloses a pitcher 380 which comprises a alternate embodiment of the pitcher 350. The pitcher 380 includes a receptacle 382 which is also of a generally square configuration, but of course could be any configuration. The receptacle 382 includes a pouring spout 384 which extends outwardly from one side and a handle 392 is disposed on the side oppositely from the spout 384.

The pitcher 380 has a smooth interior surface 386 for the receptacle 382. However, the outer configuration of the receptacle 382 comprises a plurality of alternating ribs 388 and grooves or flutes 390. Again, the purpose of the alternating ribs and grooves is to maximize the surface area of the pitcher apparatus 380, but the maximizing of the area is on the outside of the pitcher rather than the inside. The effectiveness of the microwave energy is thus still enhanced, as with the pitcher apparatus 350, but the enhancement is in a different manner in the pitcher apparatus 380.

Both pitchers 350 and 380 are illustrated as being of a generally square configuration. It is obvious that a round or other configuration may also be used.

If desired, the pitchers 350 and 380 may be darkly colored to enhance heating.

Figures 16, 17, 18:
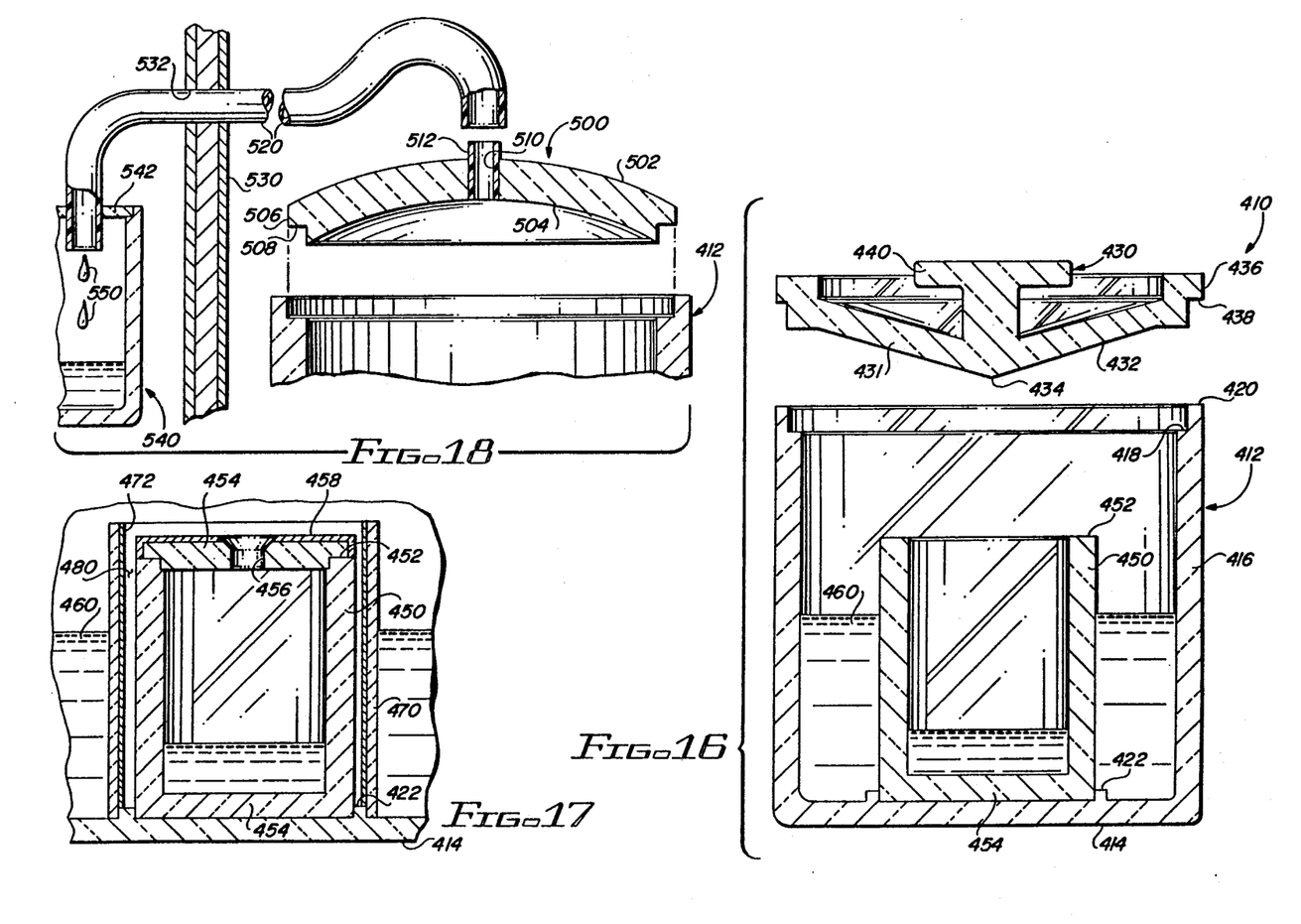
FIG. 16 is a view in partial section of another alternate embodiment of apparatus embodying the present invention.
FIG. 17 is a view in partial section of a portion of an alternate embodiment of the apparatus of FIG. 16.
FIG. 18 is a view in partial section of an alternate embodiment of the apparatus of FIG. 16.

FIG. 16 comprises a view in partial section of water purifier apparatus 410 usable with a microwave oven. The water apparatus 410 includes a pot or water holding receptacle 412 in which is disposed a pure water collecting pot or receptacle 450. The water holding receptacle 412 is closed by a lid 430.

The receptacle 412 may be of any configuration, but it is illustrated as being generally round. The receptacle 412 includes a bottom 414 with upwardly extending sides 416. The sides 416 comprise a generally circular or cylindrical element extending upwardly from the bottom 414.

The sides 416 extend upwardly from the bottom 414 to a top 420. Downwardly a short distance from the top 420 is a top lip or shoulder 418. The lip or shoulder 418 cooperates with mating portions of the lid 430, as will be described below.

Extending upwardly from the bottom 414 is a locating rim or flange 422. The locating rim or flange 422 may be conveniently used to center the collecting receptacle 450 on the bottom 414. The purpose for centering the collecting receptacle 450 is to make certain that water condensing on the bottom of the lid 430 drops into the receptacle 450. Again, this will be discussed below.

The lid 430 may include a generally conically configured center portion 431. The center portion may include a bottom surface 432. The center portion 431 tapers inwardly and downwardly. The bottom surface 432 includes a center point 434. The center point 434 is disposed generally coaxially with respect to the collecting receptacle 450.

The lid 430 may include an outer rim 436 which extends circumferentially about the center portion 431. The rim includes a bottom step 438. The bottom step 438 cooperates with the lip or shoulder 418 so that the outer portion of the outer rim 436 is disposed on the top 420 of the receptacle 412.

The lid 430 also includes a handle 440. The handle extends upwardly from the lid center portion 431. The handle 440 is preferably coaxially aligned with respect to the center portion 431 and the rim 436.

The collecting receptacle 450 is similarly a circular, cylindrical element. The collecting receptacle 450 is preferably located in the middle of the outer receptacle 412. The collecting receptacle 450 includes a top 452 and a bottom 454. The bottom 454 is preferably disposed on the bottom 414 of the receptacle 412. As illustrated in FIG. 16, the receptacle 450 is disposed or located within the locating rim or flange 422 which extends upwardly from the bottom 414 of the receptacle 412.

For use, water 460 is placed in the receptacle 412, and the collecting receptacle 450 is also placed in the receptacle 412. As shown in FIG. 16, the top of the water 460 is below the top 452 of the collecting receptacle 450. When the lid 430 is placed on the receptacle 412, the bottom point 434 of the bottom surface 432 is preferably located generally coaxially with respect to both the receptacle 412 and the collecting receptacle 450.

Microwave energy causes the water 460 to become heated and the water evaporates. The evaporated water impinges on the bottom 432 of the lid 430, and the water vapor condenses and moves by gravity to the lowest point 434. From the point 434, the condensed and purified water then falls into the collecting receptacle 450.

If desired, the receptacle 412 may be dark colored to help in the heat transfer in order to facilitate the evaporation of the water 460.

As the water 460 is evaporated, the impurities remain in the receptacle 412, while the purified water vapor rises and condenses on the bottom of the lid 430, and falls by gravity downwardly to the point 434 and into the receptacle 450. Obviously, water droplets of the condensed moisture may also fall directly into the receptacle 450 without moving to the point 434. However, and depending upon a number of variables, including the particular slope of the bottom surface of 432, probably most of the condensed moisture will fall from the bottom point 434 into the receptacle 450. It is accordingly highly desirable to have the collecting receptacle 450 generally aligned with the point 434 of the lid 430.

FIG. 17 is a view in partial section of a portion of the apparatus of FIG. 16. Under some circumstances, perhaps most circumstances, it may be necessary to provide shielding for the collecting receptacle 450 to prevent the water therein from being heated and vaporized along with the water 460. Accordingly, the apparatus 410 is slightly altered in FIG. 17.

In FIG. 17, there is an inner cylinder 470 disposed about the collecting receptacle 450. The inner receptacle 470 extends upwardly from the locating rim or flange 422 and the collecting receptacle 450 is disposed within the inner cylinder 470. The inside diameter of the cylinder 470 is slightly greater than that of the collecting receptacle 450, and accordingly there is an insulating space 480 about the collecting receptacle 450.

There is a thin layer 472 of shielding on the inner cylinder 470 to help prevent the microwave energy from reaching the collecting receptacle 450.

The collecting receptacle 450 also includes a lid 454. The lid serves two primary purposes, one of which is to help isolate the purified water within the collecting receptacle 454 and the second is to provide additional shielding for the receptacle 450 from the microwave energy. For the latter purpose, there is a shielding layer 458 disposed on the outside of the lid 454.

The lid 454 also includes an aperture 456 through which the water from the lid 430 (see FIG. 16) drops into the interior of the collecting receptacle 454. The configuration of the aperture 456 is such as to receive a portion of the lid 430. The center point 434 of the bottom surface 432 of the lid 430 extends slightly into the aperture 456. Accordingly, the water which condenses on the bottom surface 432 and moves by gravity to the point 434 drops directly into the collecting receptacle 450.

While the shielding layer 472 is shown on the inner cylinder 470, it will be obvious that the shielding layer 472 could also be disposed on the purified water collecting receptacle 450.

It will be noted that the apparatus 410, disposed in a microwave oven, subjects the water, the unpurified water, to microwave energy and the resulting heat by which bacteria and other harmful life forms are killed. The unpurified water is boiled and vaporized by the microwave energy. In the process, the water is purified. The vaporized water condenses on the bottom 432 of the lid 430, and then falls downwardly into the purified water receptacle 450 in its purified state, free from any impurities, bacteria, or other harmful life forms which may be present in the water 460.

FIG. 18 is a view in partial section showing an alternate lid 500 usable with the collection receptacle 412 of FIG. 16. The lid 500 may be used without the necessity of a water collection receptacle, such as the receptacle 450 of FIG. 16 or the modified apparatus illustrated in FIG. 17. Using the lid 500 of FIG. 18, the evaporated and purified water may be conducted outside of a microwave oven, such as through a microwave oven wall 530, by a conduit 520. The purified water is collected in a collection receptacle 540 outside of the microwave oven.

The lid 500 includes a generally convex outer configuration 502 and a generally concave inner dome 504. The lid 500 also includes an outer rim 506, with a step or shoulder 508 which matingly engages the top 420 and the top lip 418 of the receptacle 412 (see FIG. 16).

There is a central aperture 510 which extends through the dome of the lid 500 at the highest point of the dome. A connector element 512 is disposed in the aperture 510. The conduit 520 is appropriately secured to the connector element 512. The conduit 520 extends through the aperture 532 in the wall 530 of a microwave oven. The conduit 520 extends to the collection receptacle 540. As the impure water 460 boils and evaporates in the receptacle 412, the moisture rises in the receptacle and moves to the highest point of the dome of the lid 500. The water vapor flows into the conduit 520 and moves outwardly of the microwave oven through the conduit 520. Typically, the outlet of the conduit 520 will be a substantial distance below the lid 500 so that any moisture which condenses in the conduit 520 will fall by gravity through the conduit 520 and into the receptacle 540.

With the water boiling in the receptacle 412, and with the lid 500 fitting relatively tightly to the receptacle 412, the pressure within the receptacle 412 will typically be greater than the atmospheric pressure outside of the microwave oven and the flow of the vaporized water will naturally occur through the conduit 520.

In FIG. 18, the purified water 550 is shown both in water droplet form and as a liquid in the bottom of the receptacle 540. Obviously, the receptacle 540 and the wall 530 of the microwave oven comprise merely a schematic representation of an appropriate receptacle, microwave oven wall, and the like, for which the apparatus illustrated in FIG. 18, as well as the receptacle 412 of FIG. 16 may be used. The collecting receptacle 540 includes a lid 542, and the bottom end of the conduit 520 remote from the lid 500, extends to or through the lid 542. The purified water 550, condensed either in the conduit 520 or in the water collecting receptacle 540, falls to the bottom of the receptacle 540 and is there collected.

The lid 542 is preferably not tightly fitting, and accordingly the interior of the collecting receptacle 540 is subject only to atmospheric pressure. The atmospheric pressure, lower than the pressure in the receptacle 412, helps the flow of the purified water or moisture flow from the receptacle or container 540 to the collecting receptacle 540. That is, the pressure differential between the two receptacles helps to move the steam or vaporized moisture or water from the receptacle 412 to the receptacle 540.

If desired, the pressure within the collecting receptacle may be reduced below atmospheric pressure to help insure a pressure differential between the supply receptacle 412 and the collecting receptacle 540. The purified water in the conduit 520 may be in the form of steam or otherwise. Moisture that condenses in the conduit 520 flows by gravity to the collecting receptacle 540. A lower pressure in the receptacle 540 than in the receptacle 412 may aid in the flow of steam from the supply receptacle 412 to and through the conduit 520.

As is understood, the extent of condensation of the steam or vaporized water in the conduit 520 will vary, depending primarily on the temperature of the conduit. The collecting receptacle 540 is at room temperature and the temperature of the conduit 520 accordingly varies almost throughout its length between the two receptacles.

Also, as indicated in FIG. 18, the diameter of the conduit 520 may taper from a maximum at the connector 512 and the lid 500 to a minimum at the lid 542 and the collecting receptacle. This may aid in the condensing process and may increase the efficiency of the flow of the vaporized water and/or steam from the supply receptacle 412.

It will be noted that any appropriate heat source may be used for heating and vaporizing the water for purification purposes. For example, an ordinary stove top could provide the required heat.

While the principles of the invention have been made clear in illustrative embodiments, there will be immediately obvious to those skilled in the art, many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits of the true spirit and scope of the invention.

What I claim is:

1. Microwave oven apparatus for cooking food, comprising, in combination:
    a microwave oven having top means;
    walls extending downwardly from the top means;
    a bottom for receiving dish elements;
    the top means, bottom, and walls defining an interior space for cooking food placed therein by microwave energy;
    means for providing moisture in the interior space for the food being cooked, including mister means for misting the interior space;
    a condensing surface disposed below the top means on which moisture vaporized by microwave energy may condense;
    filter means spaced downwardly from the condensing surface through which moisture may pass upwardly, but preventing any moisture condensing above the filter means from dropping onto the food being cooked.

2. The apparatus of claim 1 in which the mister means includes a mister and a reservoir for water disposed beneath the bottom and pump means for pumping water from the reservoir to the mister.

3. The apparatus of claim 1 in which the mister means includes a water input conduit and a mister connected to the water inlet conduit.

4. The apparatus of claim 1 in which the means for providing moisture includes
    tray means disposed on the bottom,
    water in the tray means, and
    cooking dish means disposed in the tray means for receiving and holding food to be cooked in the microwave oven.

5. The apparatus of claim 4 in which the tray means includes a bottom and a plurality of ribs on the bottom for increasing the surface area for absorbing heat for heating the water to provide moisture for the food being cooked.

6. The apparatus of claim 5 in which the cooking dish means includes
    a bottom platform disposed on the ribs,
    a stem extending upwardly from the bottom platform,
    a dish bottom secured to the stem, and
    dish walls extending upwardly from the dish bottom.

7. The apparatus of claim 4 in which the cooking dish means includes
    a bottom platform disposed in the water in the tray means,
    a stem secured to the bottom platform and extending upwardly from the water in the tray means,
    a dish bottom secured to the stem, and
    dish walls secured to the dish bottom and extending upwardly thereon.

* * * * *